Figure 1:
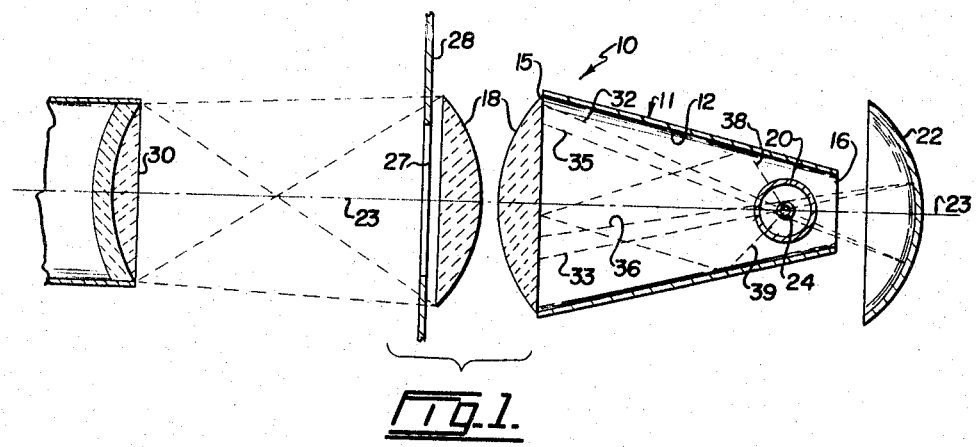

May 9, 1967     J. G. JACKSON     3,318,184
LIGHT PROJECTION OPTICAL APPARATUS

Filed Nov. 2, 1964     4 Sheets-Sheet 1

INVENTOR
JAMES G. JACKSON
BY
Fetherstonhaugh & Co.
ATTORNEYS

INVENTOR
JAMES G. JACKSON
BY
Fetherstonhaugh & Co.
ATTORNEYS

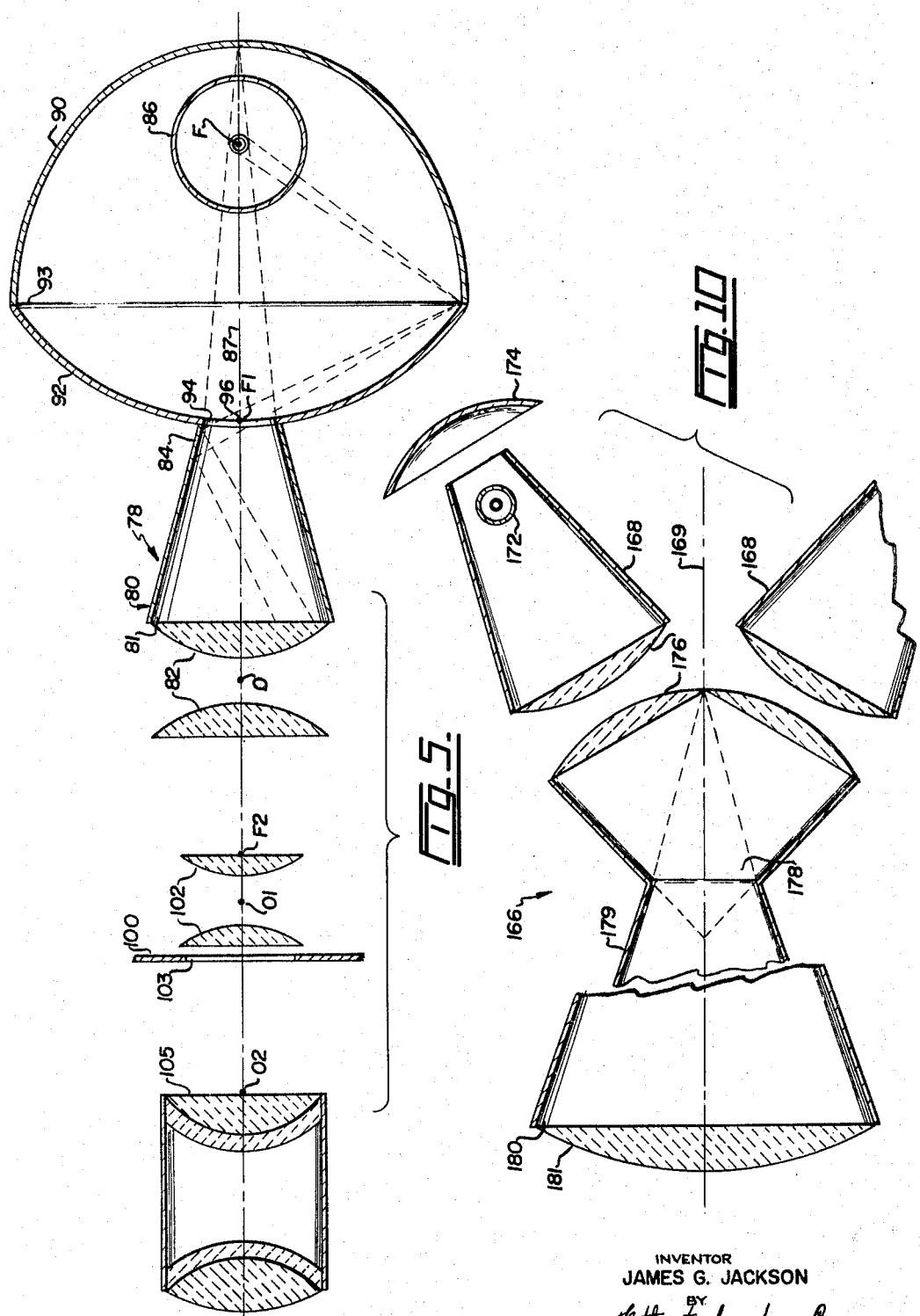

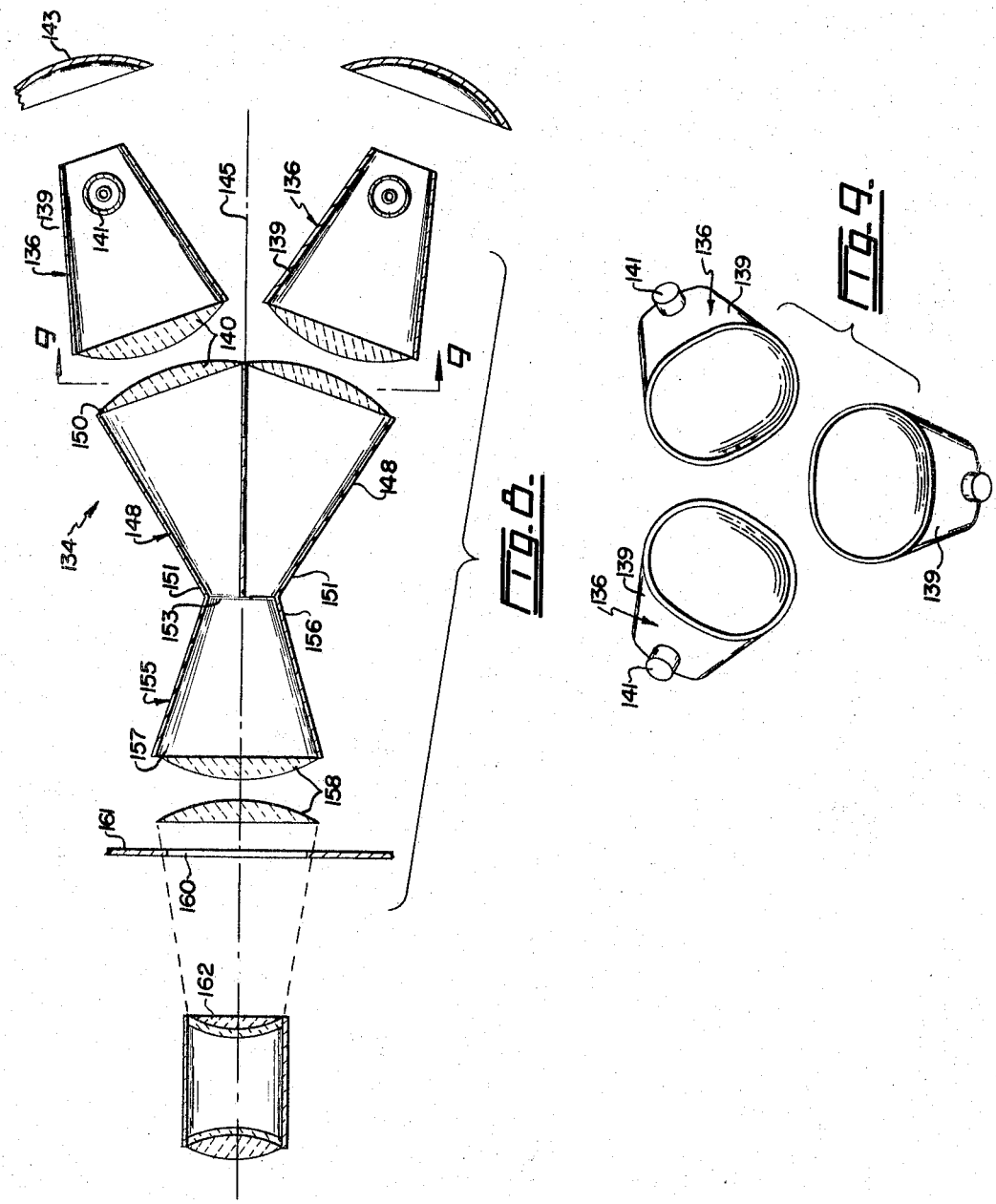

United States Patent Office 3,318,184
Patented May 9, 1967

3,318,184
LIGHT PROJECTION OPTICAL APPARATUS
James G. Jackson, 215 Argyle St., Port Alberni,
British Columbia, Canada
Filed Nov. 2, 1964, Ser. No. 408,274
15 Claims. (Cl. 88—24)

This invention relates to optical apparatus for projecting light for picture projectors and other purposes.

The main object of the present invention is to collect for projection a greater percentage of the available light from a source than has heretofore been possible.

In the prior art where filament lamps are employed, it is customary to place a set of condenser lenses directly in front of the light source or lamp. The condenser lenses collect the direct light rays produced by the filament of the lamp and condenses them into a beam which, in a picture projector, passes through a film aperture and to a projection lens. A concave reflector is usually placed behind the lamp in order to collect light from the rear of the filament. This reflector forms an image of the filament coils in the space between these coils and this light then passes on to the condenser lenses to increase the intensity of the light beam at the aperture. Although the lamp emits light throughout a complete 360° circle, the condenser system is limited to about a 90° pick-up angle, and in most cases it is only about 70°. Taking the maximum of 90° with another 90° for the rear reflector, the condenser pick-up angle is the equivalent of no more than an angle of 180° out of a possible 360°.

With the xenon short arc lamp used in prior apparatus a large mirror is placed back of the lamp to produce an image of the arc at the film aperture some distance in front of the lamp. A small mirror is placed in front of the lamp to collect light from that area. This small mirror reflects its light back to the source and through to the large rear mirror which in turn directs it to the aperture. Due to the fact that this small mirror is directly in the path of light reflected by the rear mirror there is a considerable light loss since it forms a blind spot. Light from the arc which falls on to the center section of both mirrors is lost as it can not get through to the aperture. The maximum useful pick-up angle with this two mirror system is about 220° out of a possible 360°.

The present apparatus includes an internal cone reflector having a set of condenser lenses at the large end thereof. A light source which may be a primary or a secondary light source, positioned at the small end of the cone directs light rays to the condensers to form an image of the filament at or near the surface of the projection lens. Light rays which are directed towards the reflective inner surface of the cone are reflected to the condensers to form an image of the inside of the cone at or near the projection lens. This image surrounds the filament image in a sort of halo within the aperture of the apparatus. A curved reflector is placed outwardly from the small end of the cone and is positioned and shaped to direct all light from the source travelling away from the small cone end back into said end. Some of this light goes directly to the condenser lenses, while the remainder is reflected towards said lenses by the conical reflector. The light source can be placed outside the small end of the cone reflector, in which case reflectors are provided around the source and positioned and shaped so that all light not passing directly into the small cone end is reflected into said small end. Some of this reflected light goes directly to the condensers, while the remainder is reflected to the condensers by the conical reflector.

In one preferred form of light projection optical apparatus, the light source is positioned within the conical reflector at the small end thereof, and a rear reflector is shaped and positioned to direct substantially all light from said source not travelling directly towards the condenser lenses back into the small end of the conical reflector, whence it is directed to the lenses. In another important form of this apparatus, the light source is located outside the small end of the conical reflector, an elliptical reflector surrounds the source and opens towards the conical reflector small end so that all light reflected by the elliptical reflector is directed into said small end, and a spherical reflector surrounds said small end and opens towards said elliptical reflector and is shaped to direct all light which does not travel directly to the conical reflector small end or to the elliptical reflector back to the latter reflector which, in turn, directs it into a small end of the cone.

Figure 2:
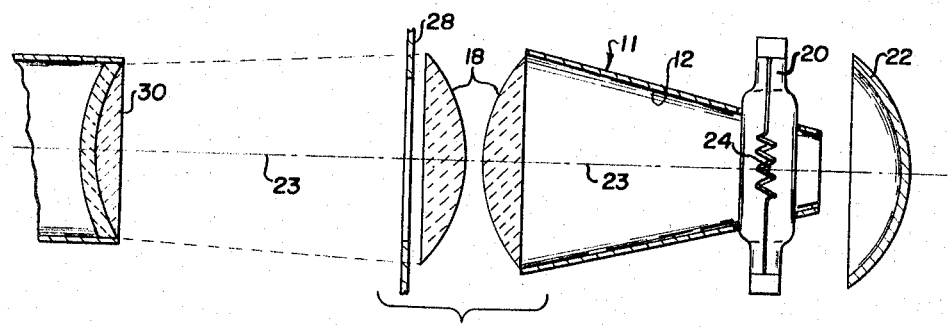
Figure 3:
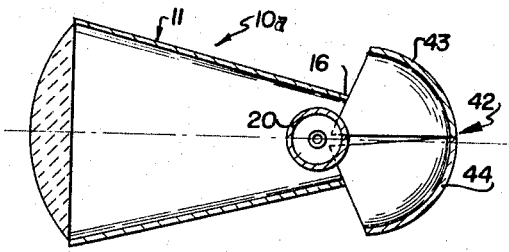
Figure 4:
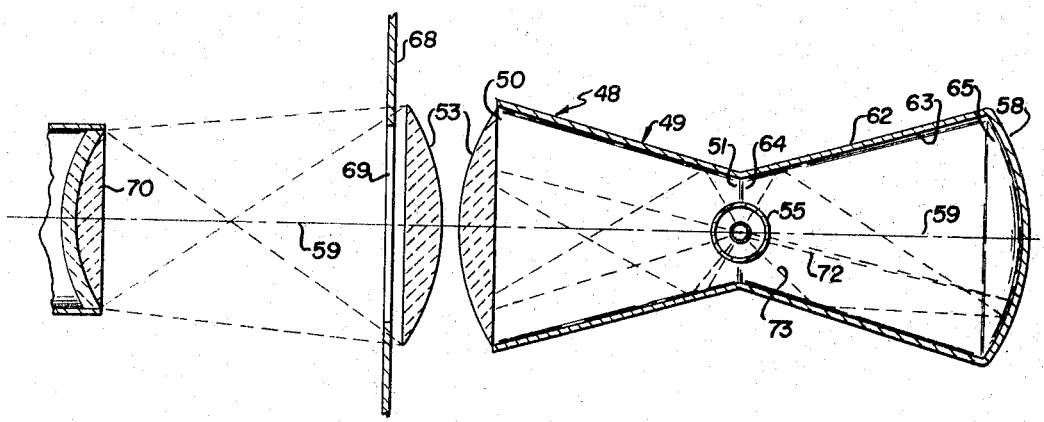
Figure 6:
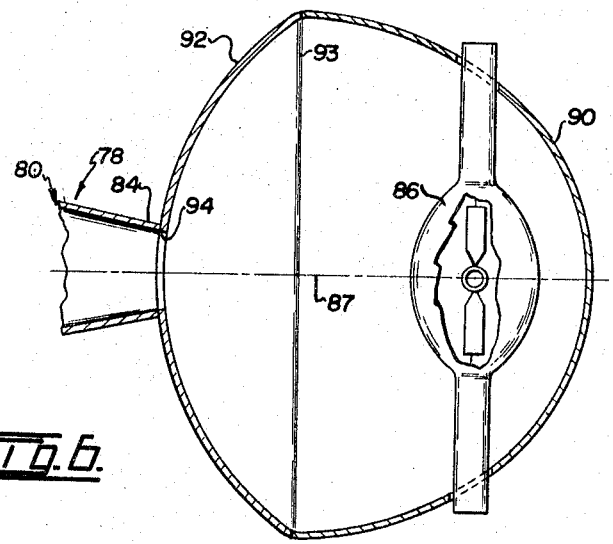
Figure 7:
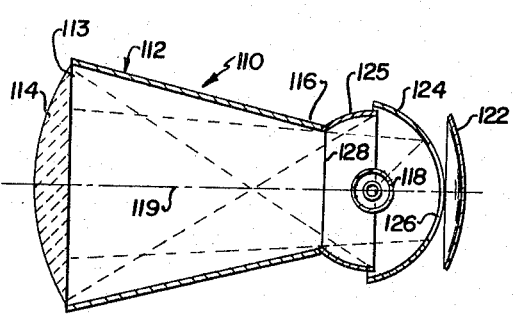

Examples of this invention are illustrated in the accompanying drawings, in which, FIGURE 1 is a horizontal section through one form of light projection optical apparatus, FIGURE 2 is a vertical section taken through the apparatus of FIGURE 1, FIGURE 3 is a view similar to FIGURE 1 of a slightly modified apparatus, FIGURE 4 is a horizontal section taken through an alternative form of light projection optical apparatus, FIGURE 5 is a horizontal section taken through another form of the apparatus, FIGURE 6 is a vertical section taken through the apparatus of FIGURE 5, FIGURE 7 is a horizontal section taken through yet another alternative form of apparatus, FIGURE 8 is a horizontal section taken through still another alternative form of apparatus, FIGURE 9 is a section taken on the line 9—9 of FIGURE 8, and FIGURE 10 is a horizontal section taken through a variation of the apparatus of FIGURE 8.

Referring to FIGURES 1 and 2 of the drawings, light projection optical apparatus 10 includes a main conical reflector 11 having an internal reflecting surface 12. Reflector 11 has a large open outer end 15 and a small open inner end 16. A set of condenser lenses 18 is provided at the outer end 15 of the conical reflector. A light source is provided at the inner end 16 of the reflector, and in this form of the invention, the source is in the form of a lamp 20, such as a quartz iodine lamp, mounted in reflector 11 at the end 16 thereof. This lamp extends through the reflector, as clearly shown in FIGURE 2.

A spherical reflector 22 is provided at the inner end 16 of reflector 11 and is positioned to direct substantially all light from source 20 not directed into or longitudinally of the reflector towards the condenser set 18, back into inner end 16 and along the reflector. In this example, reflector 22 is spaced rearwardly from the conical reflector, and the centre of the curve of said spherical reflector is on the common axis 23 of the two reflectors and in the centre of lamp 20, said centre of curvature being indicated at 24.

When apparatus 10 is used in a projector, the condenser set 18 is located at the aperture 27 of the projector, a portion of which is indicated at 28, and the apparatus includes a projection lens 30 spaced outwardly from said aperture. Lens 30, aperture 27 and condenser set 18 are all located on the longitudinal axis 23 of conical reflector 11.

FIGURE 1 illustrates light beams 32 and 33 directly from light source 20 to the condenser set 18, beams 35 and 36 from said source and which are directed by spherical reflector 22 directly to the condenser set, and beams 38 and 39 from the source which are directed by the internal reflecting surface 12 of reflector 11 to the condenser set. It will be noted that spherical reflector 22 is mounted with reference to inner end 16 of conical reflector 11 so that all light from source 20 passing outwardly from the conical reflector through end 16 is returned by reflector 22 into end 16 and travels longitudinally along reflector 11.

FIGURE 3 illustrates apparatus 10a which is only slightly different from apparatus 10. In place of reflector 22, apparatus 10a has a spherical reflector 42 positioned the same as reflector 22, but split into two halves 43 and 44 which are tipped slightly toward each other. The purpose of this is to cause any light from source 20 which would normally be directed by reflector 42 right back to the centre of the source, back past said centre to the sides thereof. With this arrangement, light reflected by reflector 42 and which would normally be lost in the source is directed into the inner end 16 of conical reflector 11.

FIGURE 4 illustrates an alternative form of light projection optical apparatus 48 having a tubular conical reflector 49 similar to reflector 11, and having a large outer end 50 and a small inner end 51. A set of condenser lenses 53 is provided at the outer end 50 of the conical reflector. A light source 55, such as a quartz lamp, is provided in the small end 51 of the reflector. A spherical reflector 58 is provided back of source 55 at the inner end 51 on the longitudinal axis 59 of reflector 49. Reflector 58 is spaced rearwardly from the light source, and another tubular conical reflector 62 extends from the inner end 51 to reflector 58. Reflector 62 has an inner reflecting surface 63, and a small open end 64 coinciding with reflector end 51 and a large end 65 which is completely covered by spherical reflector 58.

When apparatus 48 is used in a projector, part of which is indicated at 68, the condenser set 53 is located at an aperture 69 of the projector, and a projection lens 70 is aligned with the aperture and positioned on the longitudinal axis 59.

Apparatus 48 functions in the same manner as apparatus 10 with respect to conical reflector 49. However, light from source 55 which does not enter conical reflector 49 is directed to conical reflector 62 and thence to spherical reflector 58 which directs it into the inner end 51 of reflector 49 and through the latter. Beam 72 illustrates light from source 55 which is directed by reflector 58 into conical reflector 49 and directly through the latter. Beam 73 illustrates light from the source which is directed by conical reflector 62 to spherical reflector 58 and by the latter back to reflector 62 and to reflector 49 which directs it to the condenser set.

In FIGURES 5 and 6, light projection optical apparatus 78 includes a tubular conical reflector 80, similar to reflector 11, and having a large end 81 with a set of condensers 82 positioned thereat, and a small inner end 84. An actual light source 86, such as a xenon lamp, is positioned on the longitudinal central axis 87 of reflector 80 and spaced rearwardly from the inner end 84 thereof. A circular elliptical reflector 90 surrounds source 86 and extends forwardly towards conical reflector 80. From FIGURE 5, it will be seen that source 86 is completely within reflector 90. A spherical reflector 92 opens towards reflector 90 and is connected to the rim thereof at 93. Reflectors 90 and 92 are centrally located on longitudinal axis 87, and reflector 92 has an opening 94 therein coinciding with the inner end 84 of reflector 80. Elliptical reflector 90 is so positioned and shaped that all light from source 86 reflected thereby is concentrated to form a secondary source at 96 in the inner end 84 of conical reflector 80. Spherical reflector 92 is shaped and positioned to direct all light from source 86, excepting that which passes directly through inner end 84, to elliptical reflector 90 which, in turn, directs it into inner end 84.

When apparatus 78 is used in a projector, part of which is illustrated at 100, a set of secondary condenser lenses 102 is located at an apparatus 103 of the projector, and a projection lens 105 is spaced outwardly from said aperture.

The elliptical reflector 90 has focal points F and F1 on axis 87 which coincides with the centre of primary source 86 and the secondary source 96. Focal point F is also the centre of curvature of spherical mirror 92. Primary condensers 82 have an optical centre O, and focus from focal point F1 through centre O to focal point F2 which is located at secondary condensers 102 which have a focal point O1. These secondary condensers focus from point O through point O1 to the optical surface O2 of projection lens 105. If desired, secondary condenseres 102 can be omitted, in which case, primary condensers 82 would be located at aperture 103.

FIGURE 7 illustrates light projection optical apparatus 110 which is similar to apparatus 78. Apparatus 110 includes a tubular conical reflector 112 with a large open outer end 113 with a condenser set 114 therein, and a small inner end 116. A light source 118 is located on the longitudinal central axis 119 of reflector 112 and outwardly a little from the inner end 116 thereof. A spherical reflector 122 is mounted outwardly of source 118 with its centre of curvature on axis 119. Opposed spherical reflectors 124 and 125 surround source 118, and reflector 124 has a central opening 126 therein which is overlapped by reflector 122, while reflector 125 has a central opening 128 therein which coincides with the inner end 116 of conical reflector 112. With this arrangement, reflectors 122, 124 and 125 completely surround source 118. The curve and shape of reflector 122 is such that all light directed on to it from source 118 is reflected back through opening 126. All light from the source directed on to reflector 124 is reflected through the inner end 116 of conical reflector 112, while all light directed on to reflector 125 is reflected on to reflector 124 which, in turn, directs it through said inner end 116.

FIGURES 8 and 9 illustrate another alternative light projection optical apparatus 134. This apparatus includes a plurality of any one of the previously-described apparatus arranged to direct light from each one to a common set of secondary condensers. In the illustrated example, apparatus 134 includes three apparatuses 136 which are the same as apparatus 10 of FIGURE 1. With this arrangement, there are three main conical reflectors 139, each having a condenser set 140 at its outer end and a light source 141 within its inner end. A spherical reflector 143 is positioned outwardly from the inner or small end of each conical reflector 139. The conical reflectors 139 are arranged around a central longitudinal axis 145 and are inclined towards the latter. In other words, the large ends of the reflectors 139 are inclined towards axis 145, while the small ends of said reflectors are inclined away from said axis, see FIGURE 8. A second tubular conical reflector 148 is aligned with each main conical reflector 139 and has a large inner end 150 facing and coinciding with the large outer end 140 of said conical reflector, and a small outer end 151. Each condenser set 140 is located in the adjacent large ends of aligned conical reflectors 139 and 148. The conical reflectors 148 are arranged around axis 145 so that the small ends 151 thereof form a common open end 153 on axis 145.

A third tubular conical reflector 155 has a small inner end 156 coinciding with a common end 153 of the second reflectors, and a large outer end 157 in which a set of secondary condensers 158 is located. These secondary condensers are located at an aperture 160 of a projector, a portion of which is shown at 161, and said projector includes the usual projection lens 162. The common open end 153 of the secondary conical reflectors, condensers 158, aperture 160 and projection lens 162 are all on the central axis 145.

In apparatus 134, all light from the three sources 141 is directed through main conical reflectors 139, second conical reflectors 148 and third conical reflector 155.

This provides a very great concentration of light at projection lens 162.

FIGURE 10 illustrates another alternative form of light projection optical apparatus 166 which is similar to apparatus 134. A plurality of main tubular conical reflectors 168 are arranged around a common longitudinal axis 169, and each reflector 168 has a light source 172 in the small end thereof. Each reflector 168 is a duplicate of apparatus 10 of FIGURE 1, and includes a spherical reflector 174 spaced outwardly from its small inner end. Conical reflectors 168 are inclined towards axis 169, and the sets 176 of condensers in the large ends of these conical reflectors are positioned to direct all light from within conical reflectors 168 into the small inner end 178 of a second tubular conical reflector 179 having a large outer end 180 with a set of condenser lenses 181 therein. The longitudinal central axis of conical reflector 179 coincides with axis 169.

What I claim as my invention is:

1. Light projection optical apparatus comprising a main tubular conical internal reflector having a large open outer end and a small open inner end, condenser lens means at said outer end of the reflector positioned normal to the axis of the latter and through which passes all light travelling directly through and reflected by said reflector, a light source at the inner end of the reflector on said axis to direct light through the reflector, the space in the conical reflector between the light source and said condenser lens means being unobstructed, and a rear reflector shaped and positioned on the side of the light source remote from said conical reflector to direct substantially all light from said source not directed into the conical reflector back into said inner end and along the conical reflector.

2. Apparatus as claimed in claim 1 in which the light source is positioned in the inner end of the conical reflector, and the rear reflector is spaced away from said inner end and concaved with a reflecting surface curved to direct all light from the source passing out from said inner end back into the latter and along the conical reflector.

3. Apparatus as claimed in claim 2 in which the rear reflector is split into two halves tipped a little toward each other so that most light reflected by said halves into the inner end of the conical reflector misses said light source.

4. Apparatus as claimed in claim 1 in which the light source is positioned in the inner end of the conical reflector, and the rear reflector comprises a tubular conical internal reflector having a small end connected to the main reflector inner end, said rear conical reflector extending away from the main reflector to a large end, and a concaved reflector closing the large end of said rear conical reflector.

5. Apparatus as claimed in claim 1 in which the light source is outside the inner end of the main conical reflector, and the rear reflector comprises a reflecting wall connected to the inner end of the conical reflector and extending outwardly therefrom past said light source and shaped to direct light therefrom back to and past the source into the conical reflector, and a concaved reflector positioned behind the light source and outwardly from said reflecting wall shaped and positioned to direct light from the source and said reflecting wall into the conical reflector.

6. Apparatus as claimed in claim 5 in which said reflecting wall comprises a first concaved reflector connected to the inner end of the conical reflector and opening outwardly towards the light source, and a second concaved reflector opposed and connected to said first concaved reflector outwardly of the light source, said first reflector having an opening therein registering with the conical reflector inner end and said second reflector having an opening therein opposed to and substantially the same size as said opening of the first reflector.

7. Apparatus as claimed in claim 1 in which the light source is a secondary source positioned in the inner end of the conical reflector, and the rear reflector comprises a shallow circular spherical reflector connected to the inner end of the conical reflector and opening away therefrom, said spherical reflector having an opening therein registering with said inner end, a circular elliptical reflector outwardly of the spherical reflector opening into and connected to the latter at the rim thereof, and a primary light source completely within said elliptical reflector aligned with said opening of the spherical reflector, said spherical reflector being adapted to direct light from the primary source to the elliptical reflector, and said elliptical reflector being adapted to direct all light from the primary source not entering the conical reflector and from the spherical reflector into the inner end of said conical reflector to form said secondary light source therein.

8. Apparatus as claimed in claim 1 including a second conical internal reflector aligned with and extending outwardly from said main conical reflector, said second reflector having a large open inner end the same size as and coinciding with the large end of said main reflector and a small open outer end.

9. Light projection optical apparatus comprising a plurality of main tubular conical internal reflectors arranged around a common axis and angled towards said axis, each reflector having a large open end inclined towards said axis and a small open inner end inclined away from the axis, a set of condenser lenses at the outer end of each reflector through which passes all light travelling directly through and reflected by the latter reflector, a light source at the inner end of each reflector to direct light therethrough, the space in each conical reflector between the light source and the condenser set thereof being unobstructed, a rear reflector shaped and positioned on the side of each light source remote from the conical reflector thereof to direct substantially all light from the latter source not directed into said reflector thereof back into the inner end of said reflector thereof and along the latter, a second conical internal reflector aligned with and extending outwardly from each main reflector, each second reflector having a large open inner end the same size as and coinciding with the large end of the main reflector thereof and a small open outer end, the small outer ends of the second reflectors being beside each other to form a common open end for all the second reflectors, a third tubular conical internal reflector extending along said axis and having a small open inner end coinciding with said common open end and a large open outer end, and a set of condenser lenses at said outer end of the third conical reflector.

10. Light projection optical apparatus comprising a plurality of main tubular conical internal reflectors arranged around a common axis and angled towards said axis, each reflector having a large open end inclined towards said axis and a small open inner end inclined away from the axis, a set of condenser lenses at the outer end of each reflector through which passes all light travelling directly through and reflected by the latter reflector, a light source at the inner end of each reflector to direct light therethrough, the space in each conical reflector between the light source and the condenser set thereof being unobstructed, a rear reflector shaped and positioned on the side of each light source remote from the conical reflector thereof to direct substantially all light from the latter source not directed into said reflector thereof back into the inner end of said reflector thereof and along the latter, a second conical internal reflector extending along said axis and having a small open inner end adjacent the large end of the main reflectors adapted to receive light from the condenser sets of said main reflectors, said second reflector having a large open outer end, and a set of condenser lenses at said outer end of the second conical reflector.

11. Light projection optical apparatus comprising a main tubular conical internal reflector having a large open outer end and a small open inner end, condenser lens means at said outer end of the reflector positioned normal to the axis of the latter and through which passes all light travelling directly through and reflected by said reflector, and means for forming a light image in the inner end of the reflector on said axis, the space in the conical reflector between said light directing means and said condenser means being unobstructed.

12. Apparatus as claimed in claim 11 including projection lens means aligned with and spaced from said condenser lens means.

13. Apparatus as claimed in claim 2 in which said light source is located on said central longitudinal axis of the conical reflector, the rear reflector is a spherical reflector, and the centre of the curve of the spherical reflector is on said common axis and in the light source.

14. Apparatus as claimed in claim 7 in which the primary light source is positioned on said central longitudinal axis of the conical reflector, and the centre of curve of the spherical reflector is on the axis and in the primary light source.

15. Apparatus as claimed in claim 1 in which the condenser lens means is short focused, including a second conical internal reflector aligned with and extending outwardly from said main conical reflector, said second reflector having a small open inner end aligned with said condenser lens means and a large open outer end.

References Cited by the Examiner

UNITED STATES PATENTS

| | | |
|---|---|---|
| 1,302,924 | 5/1919 | Hollnagel et al. |
| 1,800,211 | 4/1931 | De Vault. |
| 1,864,696 | 6/1932 | Steele et al. |
| 2,015,722 | 10/1932 | Moreno _____ 88—24 |
| 2,604,005 | 7/1952 | Hahn _____ 88—24 |
| 3,241,440 | 3/1966 | Kugler _____ 88—24 |

NORTON ANSHER, *Primary Examiner.*

H. H. FLANDERS, R. A. WINTERCORN,
*Assistant Examiners.*